United States Patent [19]

F'Geppert

[11] Patent Number: 4,531,847

[45] Date of Patent: Jul. 30, 1985

[54] SHAFT-MOUNTED EQUIPMENTS

[75] Inventor: Erwin F'Geppert, Oakland, Mich.

[73] Assignee: The United States of America as represented by the Secretary of the Army, Washington, D.C.

[21] Appl. No.: 555,790

[22] Filed: Nov. 28, 1983

[51] Int. Cl.³ .......................................... F16C 35/063
[52] U.S. Cl. .................................. 384/519; 308/244; 384/538; 384/540; 384/585
[58] Field of Search ................... 308/236, 244, 189 A, 308/207 A, 189 R, 207 R; 384/269, 270, 271, 519, 540, 538, 517, 585

[56] References Cited

U.S. PATENT DOCUMENTS

| | | | |
|---|---|---|---|
| 3,216,272 | 11/1965 | Suchocki | 74/441 |
| 3,580,648 | 5/1971 | Zink et al. | 308/207 A |
| 3,915,517 | 10/1975 | Orefice | 384/271 |
| 4,210,372 | 7/1980 | McGee et al. | 308/189 R |
| 4,240,677 | 12/1980 | Payne et al. | 308/236 |

Primary Examiner—Lenard A. Footland
Attorney, Agent, or Firm—Peter A. Taucher; John E. McRae; Robert P. Gibson

[57] ABSTRACT

An adjustable shim structure for use between shaft-mounted equipments and shaft-support bearings, whereby axial play of the equipments is prevented. The shim structure includes two collars having meshed threads enabling the collars to be rotated relative to one another for adjusting the axial length of the collar assembly. The shaft may be connected to each bearing by means of an expansible plug extending within a circular cavity in the shaft; the plug exerts an outward radial force on the shaft wall, thus expanding the shaft into an interference fit with the associated bearing.

11 Claims, 6 Drawing Figures

SHAFT-MOUNTED EQUIPMENTS

GOVERNMENT INTEREST

The invention described herein may be manufactured, used, and licensed by or for the Government for government purposes without payment to us of any royalty thereon.

SUMMARY OF THE INVENTION

This invention relates to shaft-housing support mechanisms. As a first feature the invention relates to a novel shim or spacer system for preventing axial play of operating drive components (gears, fan wheels, electrical rotors, etc.) on their support shafts. As a second feature the invention concerns a low cost mechanism for mounting a shaft in axially spaced support bearings. The invention generally contemplates a system wherein a housing supports one or more rotary shaft(s), and operating mechanism(s) keyed on said shaft(s), the overall arrangement being such that the shaft(s) and operating mechanisms can be installed in precise locations within the housing without expending an inordinate amount of time or effort to accomplish the installation process.

In recent times manufacturers have increased the axial tolerance limits on shafts, gears, pulleys, rotors and various other drive components and housing components. This has been done primarily to decrease manufacturing costs. However the increased tolerances pose a problem at the time when the components are stacked together on the support shaft(s). Unless the total axial length of the stacked assembly is maintained within close dimensional limits there is apt to be an undesired play of the components or an undesired binding action between sliding surfaces.

To avoid undesired dimensional variations it is common practice to utilize shim-type washers in various thicknesses and combinations. Such use of shims is not entirely satisfactory in that large numbers of different thickness shims may be required. In one case approximately 100 different shims were necessary. Another problem when using multiple shims is that it is difficult to measure or estimate the shim stack thickness required in each specific situation; measurements taken with the components in a relaxed noncompressed state on the shaft may not be representative of conditions when axial pressure is applied to the assembly (during final tightening down operations).

My invention relates in part to an adjustable shim (spacer) structure that can be used in place of the conventional stack of shims usually used. The axially adjustable spacer comprises a first collar having an external thread and a second collar having an internal thread. The threads are designed so that when the collars are threaded together to any designated position they will maintain that position after the collars are subjected to axial compressive forces. The collars have the same total axial thickness before and after the tightening-down process.

The adjustable collars may have calibration markings thereon, similar to the markings on a micrometer. For example, a single reference mark may be printed on the external surface of one collar, and a plurality of circumferentially spaced marks or gradations may be printed on the external surface of the other collar. The gradation spacings will depend on the precision required. In a typical situation, the nominal axial length of the collar assembly might be one half inch; gradation spacings could correspond to axial adjustment of one ten thousandth inch. Very small changes in shim thickness can be achieved quickly, and with assurance that the change will be what is desired. No time-consuming mental calculations or juxtaposition of large numbers of different thickness washers are required.

My invention also relates to improved means for mounting the rotary shaft in the housing. The improved mounting means includes mechanism for radially expanding a section of the shaft into an interference fit with the inner race of a bearing structure in a wall of the support housing. A special plug is inserted into a cavity in an end surface of the shaft to accomplish the shaft expansion action.

The improved shaft-mounting mechanism is relatively inexpensive. Additionally the mechanism is retractible so that the shaft can be disengaged from the bearing structure if and when desired, e.g., to replace or repair the shaft or components supported thereon. The mounting mechanism has design versatility such that it can be used to connect a shaft to various different structures other than bearings, e.g., gears, lever arms, steering wheels, etc.

THE DRAWINGS

Figure 1:
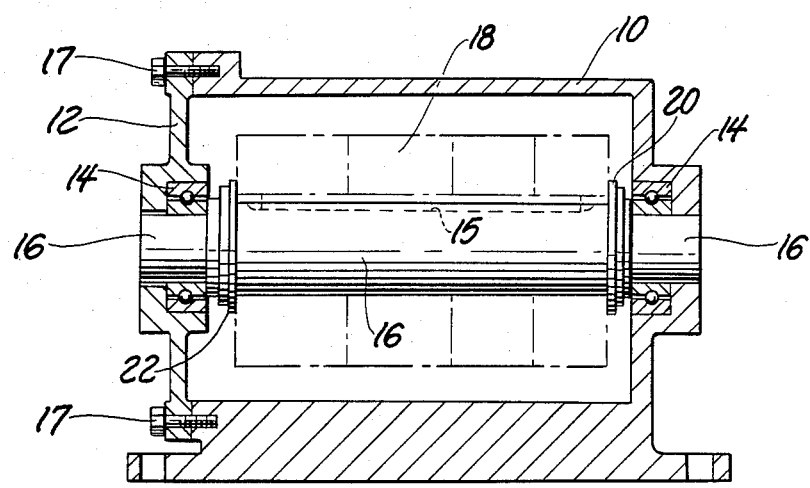
FIG. 1 is a sectional view through a housing-shaft system embodying my invention.

In the attached drawings, FIG. 1 shows a typical environment for the invention, i.e., a hollow cup shaped housing element 10 having a cover plate 12. Antifriction bearings 14 are provided in opposed ones of the housing walls for rotatably supporting a circular shaft 16. Conventional operating mechanisms or drive components 18 (which may be multiple gears, pulleys, rotors, actuator arms, impellers, etc.) are arranged on the shaft; each operating component has an internal key located in a longitudinal slot 15 in the shaft surface for securement of the component(s) on the shaft. The key(s) prevent relative rotation between the component(s) and the shaft but they do not preclude axial play or adjustment of the component(s) parallel to the shaft axis.

Axial motion of the drive component(s) is resisted by two spacers 20 and 22 that are positioned on the shaft between the end surfaces of mechanisms 18 and the inner races of bearings 14. The spacers exert axial pressures on the drive components when cover plate 12 is tightened down on housing 10, via screws 17. Spacer 20 may be a one-piece structure. Spacer 22 is designed to be axially expansible or contractible to compensate for axial tolerance variations in the various components, i.e., housing 10, bearings 14, drive components 18, etc.

Figure 2:
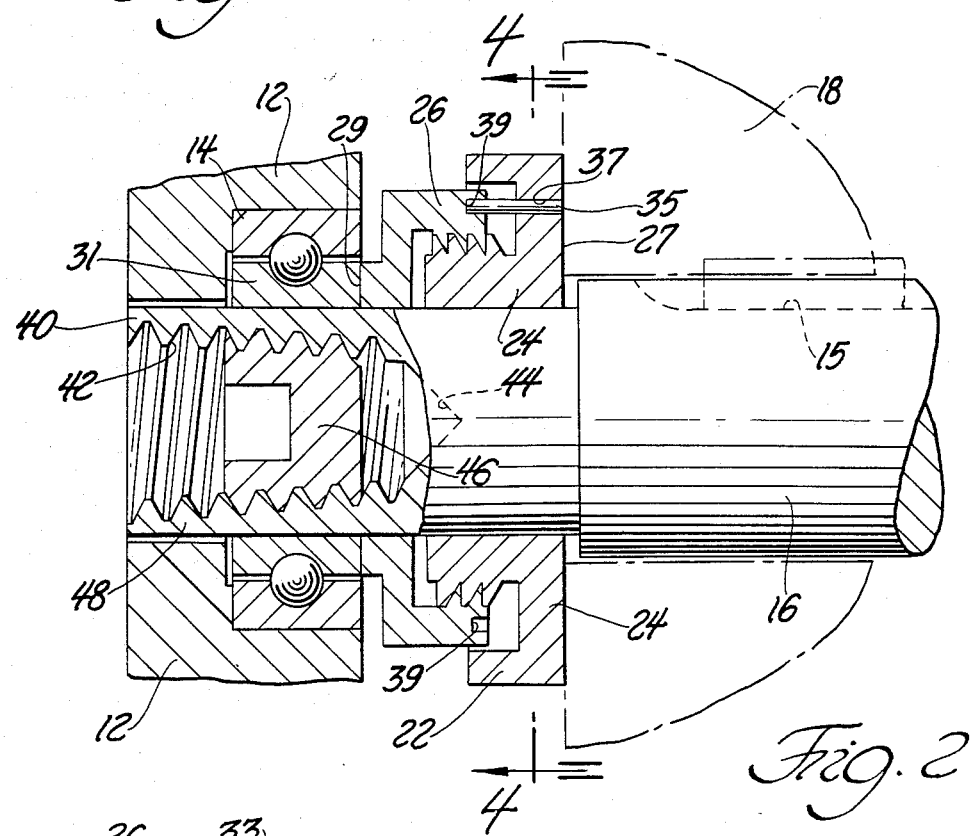
FIG. 2 is an enlarged fragmentary sectional view of componentry used in the FIG. 1 embodiment.
Figure 3:
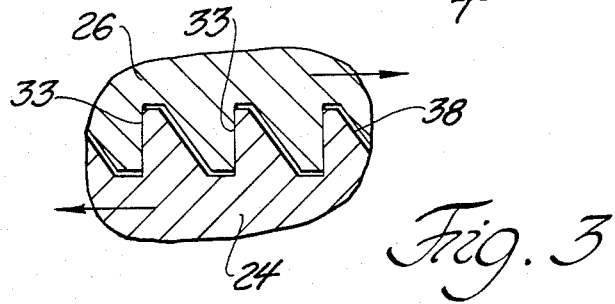
FIG. 3 is a fragmentary view of a thread structure used in the FIG. 2 componentry.

As shown in FIG. 2, spacer 22 comprises a first collar 24 having an external thread and a second collar 26 having an internal thread. The threads may be of a self-locking design that prevents relative rotation of the threaded members when the members are subject to axial loads. One suitable thread design is the buttress thread, shown in FIG. 3. The thread profile includes flat faces 33 normal to the collar axis and other faces 38 acutely angled to the collar axis. Axial loads in the arrowed directions cause faces 33 to exert increased pressures on one another, thereby tending to prevent relative rotation of the collar members. In the particular installation herein envisioned, when collar end surfaces 27 and 29 are subjected to axial pressures by operating mechanisms 18 and bearing race structure 31 the collars will remain locked together without reduction in the length of the collar assembly. The intent is that the collar assembly be effective as a rigid spacer or shim throughout the expected life of the mechanism.

It is believed that some variation in thread design and pitch (threads per inch) could be employed to obtain the self-locking feature. For example, two threaded members can be made self-locking if one of the threaded members has a portion of the thread surface formed by a resilient plastic material; the plastic may be a plastic block locked into an axial slot in the thread surface on one of the members. So-called Dardelet threads also have self-locking characteristics.

Figure 4:
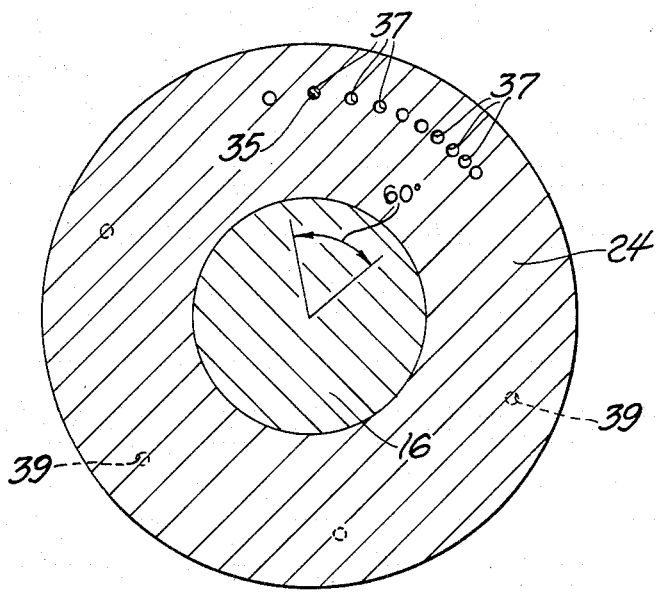
FIG. 4 is a view taken on line 4—4 in FIG. 2.

Also, it is contemplated that a mechanical means could be used to lock the two collars in selected positions of adjustment. As seen in FIG. 2, the mechanical lock means comprises a small pin or rod 35 extending through a hole 37 in collar 24 into a cylindrical recess 39 in collar 27. The preferred system would involve a number of holes 37 selectively registerable with different recesses 39 to achieve a variety of adjusted locked positions. As seen in FIG. 4, collar 24 has ten holes 37 located within a sixty degree arc measured from the collar axis. The hole spacing is different for each of the ten hole spacings. Collar 24 has six recesses 39 equally spaced. Using these six recesses with the ten holes 37 it is possible to have sixty different adjusted collar-locked positions for any complete rotation of one collar relative to the other. FIG. 4 is illustrative of the general concept for mechanical lock-up in selected positions of collar adjustment.

The adjustable shim or collar assembly 22 may have calibration markings thereon, similar to the markings on a micrometer. For example, a single reference mark may be printed on the external peripheral edge surface of collar 26, and a plurality of circumferentially spaced marks or gradations may be printed on the external peripheral surface of collar 24. The gradation spacings will depend on the precision required. In a typical situation, the nominal axial length of the collar assembly might be one half inch; gradation spacings on collar 24 could correspond to axial adjustments of one ten thousandth inch. The lock pin 35 would of course be inserted into the appropriate hole-recess combination with the collar assembly detached from shaft 16.

Shim structure 22 can be positioned between the end surface of operating component(s) 18 and bearing inner race 31. Alternately the shim structure can be positioned at an intermediate point on shaft 16, i.e., between different ones of the operating components.

In one possible method of installation it may be assumed that prior to the time that shim structure 22 is installed on shaft 16 the shaft is affixed to the rightmost bearing 14 but freely slidable relative to the leftmost bearing. In that event adjustable structure 22 would be set to a thickness slightly greater than the expected final thickness such that when cover plate 12 is installed on the housing a slight space will exist between the cover plate and the opposed face of the housing. That space can be measured, and the axial thickness of structure 22 adjusted accordingly. When the cover plate is reinserted on housing element 10 axial looseness or play of the operating component(s) on shaft 16 will be eliminated. Thickness adjustments of structure 22 will be made with the structure removed from shaft 16.

An alternate installation procedure can be envisioned wherein shaft 16 is freely slidable relative to both bearings 14 when structure 22 is initially installed on the shaft. Assuming that structure 22 has a lesser axial thickness than required to take up end play, cover plate 22 will take a position flush against housing element 10; shaft 16 will be capable of back-and-forth movement relative to the housing. Measurement of the back-and-forth motion and removal of the cover plate can be used to effect adjustments in the axial thickness of shim structure 22. When cover plate 12 is reinserted onto housing element 10 the end play will be eliminated. The shaft can be affixed to the inner races of bearings 14 as the final step in the shaft installation operation. The procedure is applicable where a plurality of shafts are to be installed.

The primary advantage of adjustable spacer structure 12 is the fact that very small changes in shim (spacer) thickness can be achieved quickly, with assurance that the change will be what is desired. No time-consuming mental calculations or juxtaposition of large numbers of different thickness washers are required.

The noncompressible nature of the adjustable shim structure 22 is advantageous in that measured end play can be used as the exact adjustment required of the shim structure. When multiple washers are used there is a possibility that the washers will be reassembled in a different sequence or with some washers rotated. The washer faces may not be exactly parallel or minutely smooth. Variations in parallelness or smoothness result in different washer stack dimensions, from one measurement to the next. Additionally, it is difficult to arrive at precise stack thicknesses since very thin washers less than about 0.0010 inch thick are not feasible. The adjustable spacer structure would eliminate many disadvantages of conventional stacked shim structures.

Figure 5:
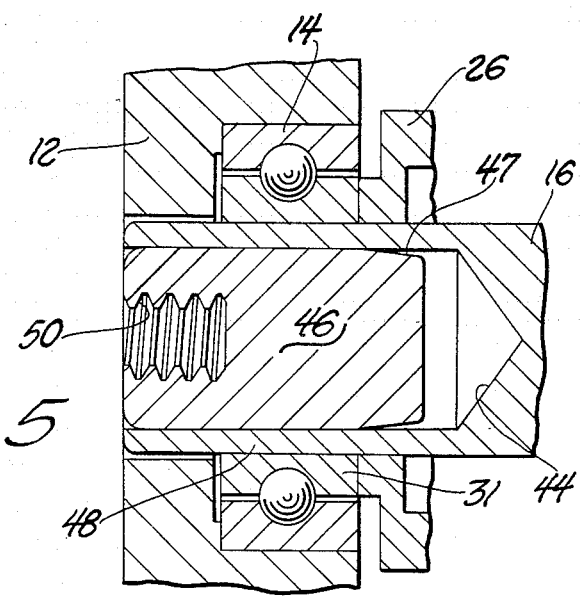
FIG. 5 is a sectional view taken in the same direction as FIG. 2, but illustrating a variant of the invention.

The adjustable shim structure is especially useful if the detachable housing component (cover 12) is readily removable for measurement of shaft-component end play. Such measurements are difficult, if not impossible, after the shaft is rigidly affixed to both bearings 14. I propose a shaft-bearing connection system wherein the shaft-bearing connections can be made at any time, before or after the end play measurements are made. Preferably the shaft-bearing connections are of a type wherein the connections can be disengaged or released at any time (before or after initial assembly of the system). FIG. 2 shows one form that the shaft-bearing connection means can take. A second form is shown in FIG. 5.

Referring to FIG. 2, the end of shaft 16 has an axial cavity extending inwardly from shaft end face 40. The cavity annular surface is formed with threads 42 that taper radially inwardly when measured in a left-to-right direction, i.e., from end face 40 toward the cavity inner end surface 44. The taper on threads 42 is relatively slight, such that when a tapered threaded plug 46 is screwed into the cavity the plug reaches a point along the cavity axis where the plug begins to exert only a moderately increasing expansion force on the annular wall 48 defined by the cavity. The thread taper on plug 46 matches the taper on threads 42.

The diameter of plug 46 is selected so that the plug begins to exert an expansion force on wall 48 when the plug has not yet reached the illustrated position radially aligned with inner race 31 of bearing 14. The expansion force exerted by the plug expands annular wall 48 outwardly so that its outer surface achieves an interference fit with the inner surface of bearing race 31. By making the plug-cavity thread tapers very slight it should be possible to have a relatively long shaft length subject to the expansion effect (to increase the shaft-bearing contact area). The annular thickness of wall 48 is preferably small enough that the wall transmits the plug force to the bearing inner race (rather than absorbing the force as internal compressive deflection or densification).

The initial fit of bearing race 31 on shaft 16 (prior to insertion of plug 46 into the shaft cavity) is preferably a so-called snug fit; i.e., a close fit achieved by hand assembly where there is no wobble or perceived play between the shaft and bearing. Expansion of wall 48 by insertional motion of plug 46 is sufficient to produce an interference fit, i.e., a fit in the nature of a force fit. Diametrical expansion of wall 48 would in most cases be 0.001 inch or less; such a slight expansion can be achieved within the elastic limits of steels or other materials commonly used for shaft 16. Since the expansion is within the elastic limit of the shaft material it is possible to later effect a disengagement of the shaft from the bearing inner race by unscrewing plug 46 out of the shaft cavity.

It is believed that the shaft-bearing connection force can be at least roughly controlled by using a torque wrench to screw in plug 46. With the wrench set at a torque value corresponding to a known connection force (established by trial-error experimentation) the plug can be screwed in to the torque wrench setting. Different types of fits can be established (e.g., light, medium or heavy force fits) for different shaft-bearing material combinations.

The use of tapered threads is advantageous in that the connection force is roughly ascertainable (known) by selecting the torque setting on the torque wrench. However, it is believed possible to use threads of a non-tapered character. In such a case threads 42 would preferably include one or more oversize turns to lead the threaded plug into the shaft cavity. The plug threads would be oversize relative to threads 42, i.e., the threads on the plug would have slightly larger diameters than the cavity threads so that rightward movement of the plug along the cavity would expand incremental areas of the cavity wall into an interference fit with the bearing inner race.

The plug-cavity connection system shown in FIG. 2 can also be used for the non-illustrated (right) end of the shaft. Final connections between shaft 16 and the inner races of bearings 14 can be made before or after shim 22 is in its final adjusted condition. Either end of the shaft can be disengaged from its associated bearing structure 14 to facilitate end play elimination operations or repair/replacement operations on components 18.

FIG. 5 shows an alternate form of plug usable to detachably connect the shaft to a bearing (either end of the shaft). In this case the shaft cavity surface and plug surface are smooth uninterrupted surfaces. The plug is driven into the cavity by a pressing or hammering operation, such that as the plug moves into the cavity the relatively thin semielastic wall 48 is moved outwardly into an interference fit with the inner surface of bearing race 31. Outward deflection of wall 48 is preferably less than 0.001 inch (measured on the shaft diameter). A threaded recess 50 may be formed in the outer end of the plug to receive a non-illustrated puller tool if/when it is desired to disengage the shaft from bearing race 31.

The right (inner) end of plug 46 may be tapered, as at 47, to facilitate initial plug insertion partway into the shaft cavity. The plug surface to the left of taper 47 can be of uniform diameter or slightly flared (in a right-to-left direction), depending on what is desired in the way of wall 48 deflection. The shaft can be disengaged from the inner race of bearing 14 by pulling plug 46 out of the shaft cavity.

Figure 6:
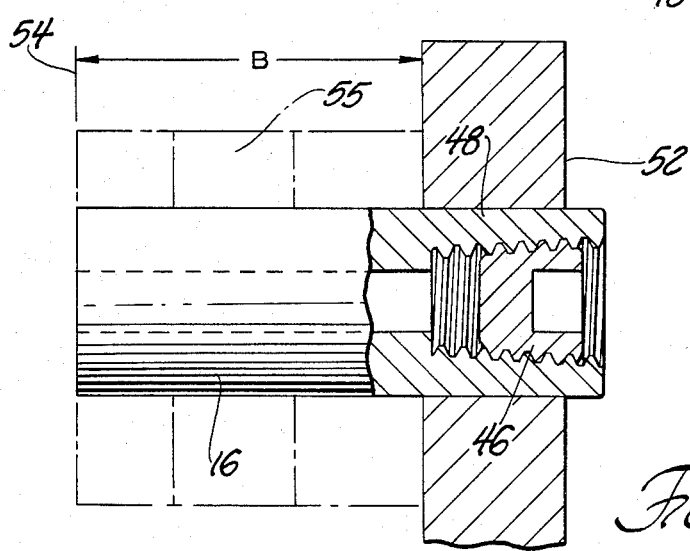
FIG. 6 is another fragmentary sectional view illustrating another variant of the invention.

The plug-induced expansion connection shown in FIGS. 2 and 5 can be used in a variety of different situations. FIG. 6 shows an arrangement wherein shaft 16 is to have a fixed connection with structure 52 at a particular point along the shaft length; in the drawing dimension B represents the desired spacing of structure 52 from a fixed reference point or plane 54. Structure 52 can be any one of several different structures, e.g., a handle, gear, lever, roller, fan wheel, etc.

Securement of structure 52 is accomplished by a screw-in motion of threaded plug 46 in the previously described fashion. The expansible connection can be disengaged by a reverse screw-out motion of plug 46. The plug and associated shaft cavity could be smooth-surfaced, as shown in FIG. 5. Chief advantages of the illustrated connection mechanism is that it is disengageable, economical, and space efficient (i.e., it uses space within the plane of structure 52, without taking up extra space along the length of the shaft). Additionally the illustrated connection mechanism permits limited axial adjustment of structure 52, i.e., repositionment of structure 52 to achieve a desired dimension B dictated by tolerance variations in the axial thickness of structure 55.

I wish it to be understood that I do not desire to be limited to the exact details of construction shown and described for obvious modifications will occur to a person skilled in the art, without departing from the spirit and scope of the appended claims.

I claim:

1. In an assembly that comprises a housing having opposed walls, a bearing structure located on each of said walls, a circular shaft having longitudinally spaced areas thereof extending within the bearing structures whereby said bearing structures support the shaft for rotational motion around its longitudinal axis, operating mechanism mounted on the shaft in the space between the bearing structures, and shim means between the operating mechanism and one of the bearing structures: the improvement wherein the shim means comprises two rotary collars adapted to encircle the shaft, one collar having an internal helical thread thereon, the other collar having an external helical thread thereon, the internal thread and external thread being meshed together whereby relative rotation of one collar on the other varies the axial length of the collar assembly, said collars having flat radial annular end surfaces of substantial area engageable respectively with the operating mechanism and said one bearing structure to prevent axial play of the operating mechanism on the shaft.

2. The improvement of claim 1 and further comprising micrometer markings on the outer peripheral edge surfaces of the collars denoting the adjusted axial length of the collar assembly.

3. The improvement of claim 1 wherein the meshed threads on the collars are constructed to lock together in response to axial pressures applied to the collar end surfaces, whereby the collar assembly maintains its original length after installation on the shaft.

4. The improvement of claim 1 wherein the housing includes a hollow housing component defining one of said opposed walls, and a cover plate defining the other opposed wall; said cover plate being secured to said housing component by means of screws extending through the cover plate into the housing component, said screws extending parallel to the aforementioned shaft whereby tightening actions on the screws draw the cover plate and the associated bearing structure toward the aforementioned operating mechanism; the collar assembly being constructed so that when the cover plate is flush against the housing component the operating mechanism has no axial play on the shaft.

5. The improvement of claim 1 wherein each bearing structure comprises an outer race secured to a respective one of the opposed housing walls, and an inner race secured to the shaft; the aforementioned collar assembly being engageable with the inner race of said one bearing structure.

6. The improvement of claim 1 wherein ends of the shaft radially aligned with the bearing structures have axial cavities therein, the annular shaft walls defined by said cavities being relatively thin and elastic; and a plug means forced into each cavity; each plug means having an outer dimension slightly greater than the internal dimension of the associated annular shaft wall when initially formed, whereby each plug means exerts sufficient force on the associated shaft wall to expand it outwardly into tight interference engagement with the inner surface of the associated bearing structure inner race.

7. The improvement of claim 6 wherein each plug means is removable from the associated cavity.

8. The improvement of claim 7 wherein the radial dimensions of the cavities and associated plugs are such that the outward expansion of each shaft annular wall is within the elastic limit of the wall material, whereby removal of the plug from the cavity returns the shaft annular wall to its original dimension.

9. The improvement of claim 8 wherein each inner race has a snug fit on the shaft outer surface before the associated plug is inserted into the cavity, the dimension of each plug being such that the associated shaft annular wall undergoes a diametrical expansion in the neighborhood of 0.001 inch when the plug is forced into the cavity.

10. The improvement of claim 6 wherein the inner surfaces of the shaft annular walls and the outer surfaces of the associated plug means are threaded, whereby each plug means is forced into the associated cavity by a turning motion.

11. The improvement of claim 10 wherein the thread surfaces taper radially inwardly when measured in a direction looking toward the cavity inner end surface.

* * * * *